(No Model.)
J. F. SPENCER.
HUB ATTACHING DEVICE.
No. 579,188. Patented Mar. 23, 1897.
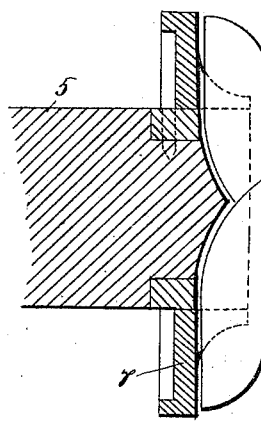
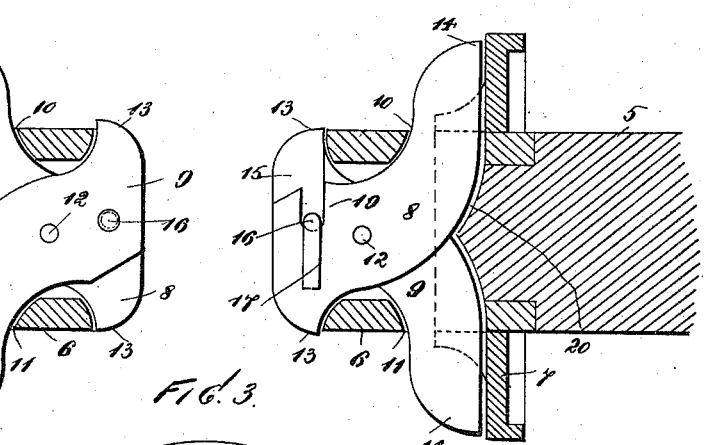
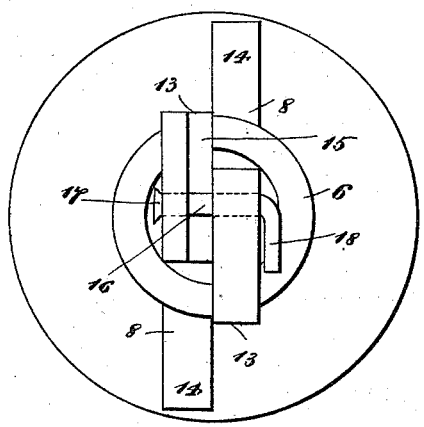
WITNESSES
INVENTOR
James F. Spencer
BY
Edgar Tate & Co
ATTORNEYS

UNITED STATES PATENT OFFICE.

JAMES FINLEY SPENCER, OF POMONA, CALIFORNIA, ASSIGNOR OF ONE-HALF TO GEORGE WASHINGTON OGLE, OF SAME PLACE.

HUB-ATTACHING DEVICE.

SPECIFICATION forming part of Letters Patent No. 579,188, dated March 23, 1897.

Application filed December 17, 1896. Serial No. 616,076. (No model.)

*To all whom it may concern:*

Be it known that I, JAMES FINLEY SPENCER, a citizen of the United States, residing at Pomona, in the county of Los Angeles and State of California, have invented certain new and useful Improvements in Devices for Securing Wheels of Carriages, &c., to the Spindles Thereof, of which the following is a full and complete specification, such as will enable those skilled in the art to which it appertains to make and use the same.

This invention relates to devices for securing the wheels of carriages, wagons, trucks, and other vehicles on the spindles thereof; and the object of the invention is to provide an improved device of this class by means of which the wheels may be secured in position upon the spindles in such manner that they cannot accidentally come off.

The invention is fully disclosed in the following specification, of which the accompanying drawings form a part, in which similar numerals of reference designate the same parts wherever found throughout the several views, and in which—

Figure 1 is a central longitudinal section of the end of a spindle provided with my improved device for securing the wheel in place; Fig. 2, a similar view showing the opposite side of the device for securing the wheel in place, and Fig. 3 an end view.

In the drawings forming part of this specification I have shown at 5 the end of one of the spindles of a vehicle, and in the practice of my invention I secure thereon in any desired manner a short tube or ferrule 6, the outer surface of which is flush with the surface of the spindle. I also mount on the inner end of the tube or ferrule 6 an annular band or washer 7, which may be removed from the spindle or placed in position whenever desired, and in order to secure the washer or band 7 in position and the wheel upon the spindle I provide two similar jaws or levers 8 and 9.

Formed in the opposite sides or the upper and lower sides of the tube or ferrule 6 are longitudinal slots or openings 10 and 11, and the jaws or levers 8 and 9 are pivotally connected at 12, and the outer ends of each are curved outwardly, so as to overlap the end of the tube or ferrule at 13 when the jaws or levers are in position, as shown in Figs. 1 and 2, and the inner ends thereof are curved outwardly, so as to pass through the slots or openings 10 and 11 and to abut against the outer side of the annular band or washer 7, as shown at 14.

The head of the lever or jaw 9 is cut away transversely, as shown at 15, and passing through the head of each of the jaws or levers outside of the end of the tube or ferrule 6 is a key-bolt 16, which is provided at one end with a head 17 and at the opposite end with an angular arm or projection 18.

The key-bolt 16 passes through a circular opening in the head of the lever 9 and through a slot 19 in the head of the lever 8, and all that is necessary in order to secure the annular plate or washer 7 and the wheel on the spindle is to turn the key-bolt in the direction opposite to that shown in Figs. 2 and 3 and slide the same outwardly through the head of the lever 8 until the arm or projection 18 thereof enters the transverse groove 15 in the head of the jaw or lever 9 and then press the ends 14 of the dogs or levers together and pass them into the outer end of the ferrule or tube 6, and by pressing on the outer ends or heads thereof the ends 14 will pass through the slots or openings 10 and 11 and into the position shown, and then by pulling the arm or extension 17 outwardly through the slot 19 and turning it into the position shown in Figs. 2 and 3 the dogs or levers will be locked in place.

In order to remove the wheel and washer from the spindle, it is only necessary to reverse this operation by turning the arm 18 of the key-bolts reversely to the position shown in Figs. 2 and 3 and sliding it through the slot 19 in the head of the dog or lever 8 into the transverse groove or slot 15, into the head of the dog or lever 9, and then by pressing in opposite directions on the heads of said levers they will slide out of the end of the tube or ferrule 6, when the washer and wheel may be removed in the usual manner.

The central portion of the end of the spindle is curved or inclined, as shown at 20, in order to facilitate this operation of the levers or dogs, and my improved device for securing the wheel in place may be applied to a metal spindle or to a spindle composed of wood, and in the latter event the tube or ferrule 6 may be lengthened so as to cover the entire spindle.

When the key-bolt 16 is in the position shown in Figs. 2 and 3, the levers will be securely locked in place and cannot be detached from the tube or ferrule, and the danger of the loss thereof and of the accidental removal of the wheel from the spindle is obviated, and the only way in which the levers can be detached from the tube or ferrule and the wheel removed from the spindle is by operating the key-bolt as hereinbefore described.

By means of my improvement I avoid the use of screw-threaded nuts, lock-nuts, and similar devices, and by means thereof a wheel may be much more easily and quickly removed from and placed on the spindle than by other devices heretofore employed for this purpose.

Having fully described my invention, I claim as new and desire to secure by Letters Patent—

The herein-described device for securing a wheel on the spindle of a vehicle, said device consisting of a tube or ferrule mounted on the end of the spindle, and provided with slots or openings in its opposite sides, and two similar curved jaws or levers which are pivotally connected, and the ends of which are adapted to be inserted into the outer end of the tube or ferrule, and to pass through said slots or openings, levers being provided with heads at their outer ends which are adapted to overlap the opposite sides of the end of the tube or ferrule, and a key-bolt which is passed through one of said heads and through an open slot formed in the other, and provided with an arm or extension at one end, the head of one of said jaws or levers being provided in its inner side with a transverse groove which is adapted to receive said arm or extension, substantially as shown and described.

In testimony that I claim the foregoing as my invention I have signed my name, in presence of the subscribing witnesses, this 5th day of November, 1896.

JAMES FINLEY SPENCER.

Witnesses:
   ALVIN TUFTS,
   GEORGE BECK.